Oct. 12, 1937.　　　G. G. MERCHEN　　　2,095,509
SCALE
Filed Jan. 22, 1937　　　3 Sheets-Sheet 1

INVENTOR.
Glen G. Merchen
BY
Glenn L. Fish
ATTORNEY.

Oct. 12, 1937.  G. G. MERCHEN  2,095,509
SCALE
Filed Jan. 22, 1937  3 Sheets-Sheet 2

INVENTOR.
Glen G. Merchen
BY
Glenn L. Fish
ATTORNEY.

Oct. 12, 1937.    G. G. MERCHEN    2,095,509
SCALE
Filed Jan. 22, 1937    3 Sheets-Sheet 3
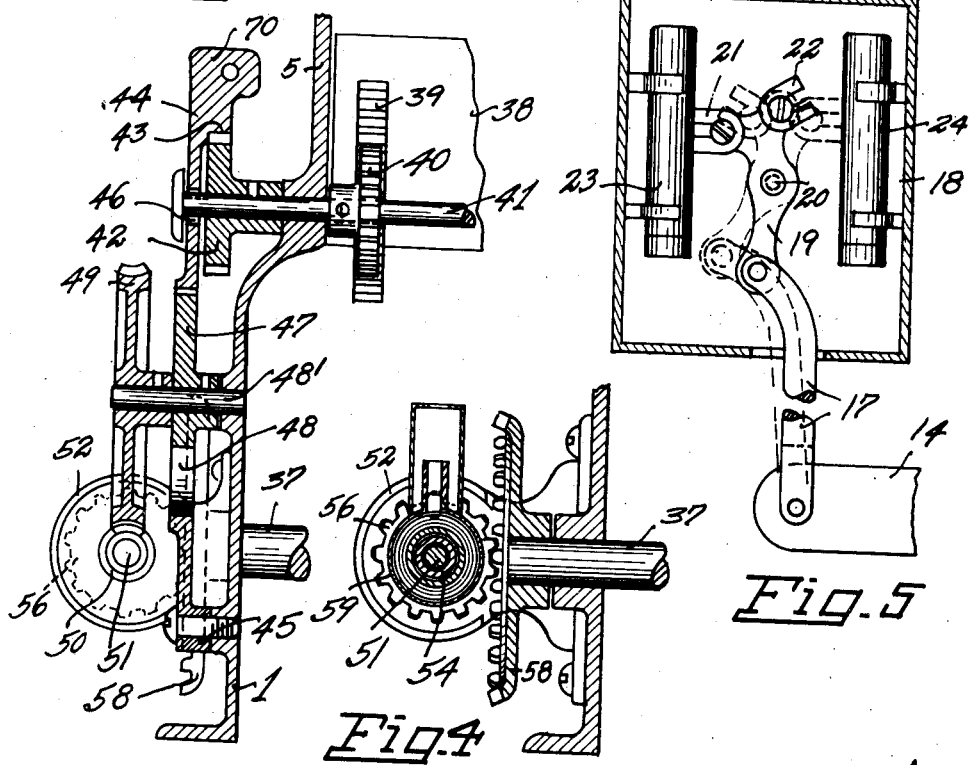
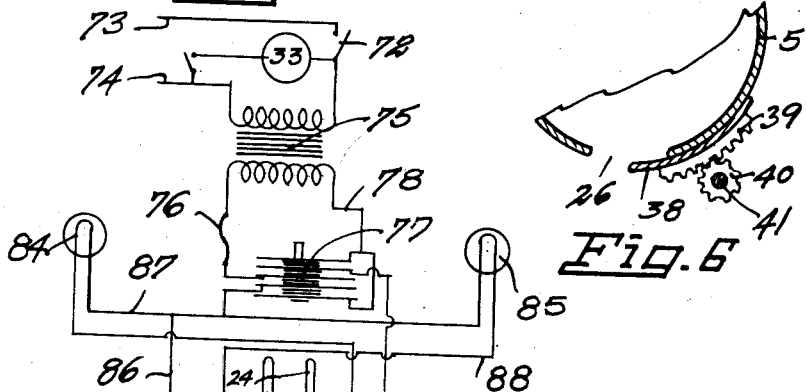
INVENTOR.
Glen G. Merchen
BY
Glenn L. Fish
ATTORNEY.

Patented Oct. 12, 1937

2,095,509

UNITED STATES PATENT OFFICE 2,095,509

SCALE

Glen G. Merchen, Spokane, Wash.

Application January 22, 1937, Serial No. 121,796

9 Claims. (Cl. 249—2)

This invention relates to a scale for weighing a continuously moving stream of finely ground material such as flour, ground feed, insulation, cement, ores, and other ground materials.

One object of the invention is to provide a scale of such construction that the ground material may be fed from a hopper onto a weighing platform adapted to support in a balanced condition a predetermined weight of material and along which the material is moved at a predetermined rate of speed so that when the scale is in operation, the quantity of material moved through the scale along the weighing platform thereof in a minute or any other predetermined length of time will be known in advance and thus permit the total quantity of material which passes through the scale to be accurately determined by noting the length of time the scale has been in operation or by reading a counter in order to ascertain the number of revolutions made by the drive shaft of an endless conveyor employed to move the material along the weighing platform of the scale.

Another object of the invention is to provide improved means for controlling flow of material from a hopper onto the weighing platform, the said means consisting of a gate for the hopper and electrically actuated means for moving the gate towards or away from a closed position, and operation of the electrically actuated means being controlled by movements of the weighing platform caused when the speed at which the material flows from the hopper varies.

Another object of the invention is to so construct the electrically actuated means for moving the gate of the hopper that it will be sufficiently sensitive to act promptly when the flow of material varies, and to also permit it to be actuated when flow of material either increases or decreases from the normal rate of speed.

It is another object of the invention to so construct the gate actuating means that it may be adjusted to control the neutral position of the gate and thus allow the gate to be set in a position in which a predetermined quantity of material may flow from the hopper during a predetermined length of time when the scale is adjusted to balance at a certain weight.

Another object of the invention is to provide a scale of this character in which the gate adjusting means is of a compact and sturdy construction and not liable to get out of order when the scale is in use.

The invention is illustrated in the accompanying drawings, wherein

Figure 3 is a fragmentary sectional view taken vertically through the cam mechanism along the line 3—3 of Figure 1.

Figure 4 is a sectional view taken vertically through the rear drive along the line 4—4 of Figure 1.

Figure 5 is a view partly in section and partially in elevation of the switch controlling opening and closing of the hopper gate.

Figure 6 is a fragmentary sectional view of the lower portion of the hopper and its gate.

Figure 7 is a sectional view taken horizontally through the solenoid forming an element of the electrically actuated means for adjusting the hopper gate, the view being taken along the line 7—7 of Figure 1.

Figure 8 is a wiring diagram of the circuits for the electrically actuated mechanism of the scale.

Figure 1:
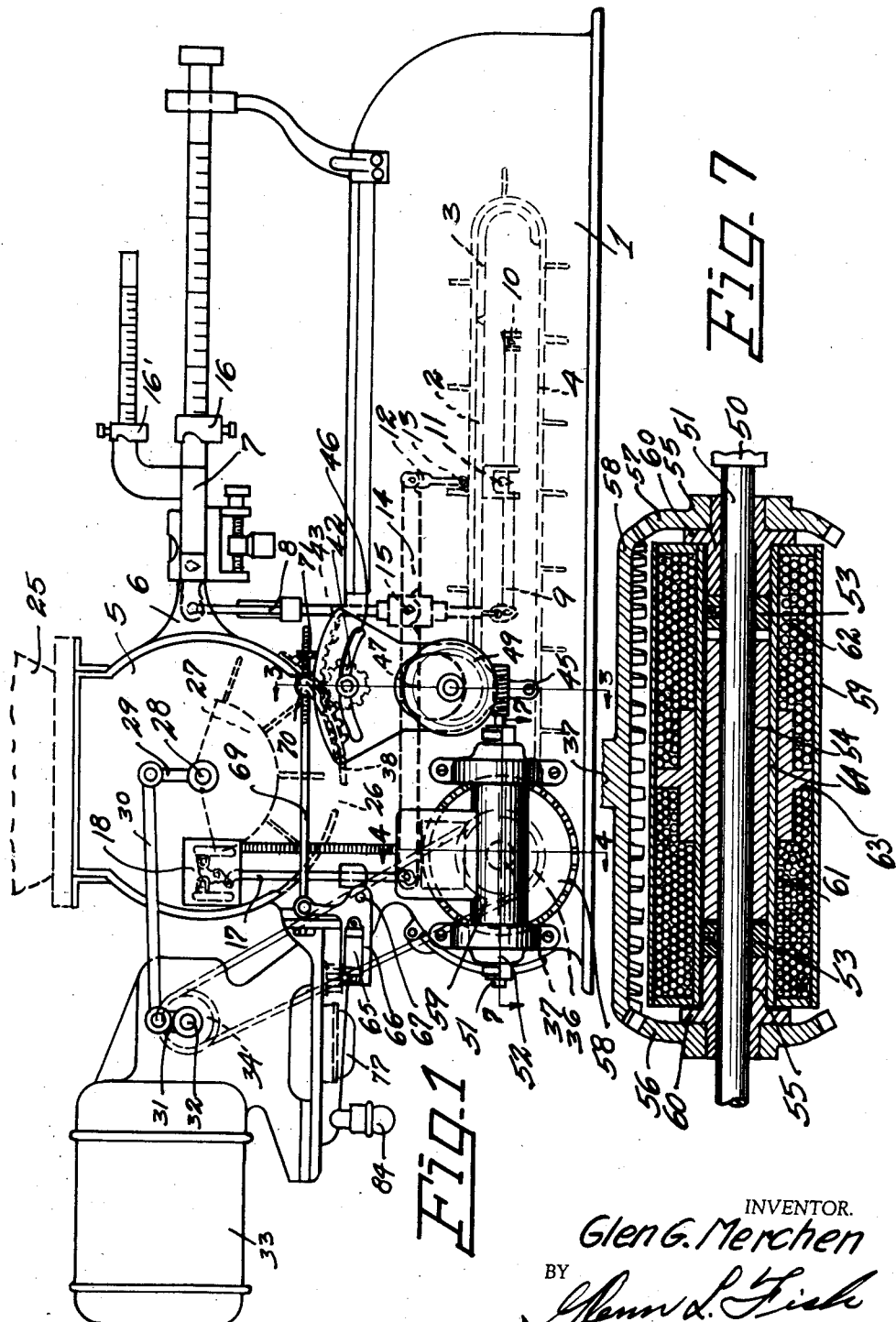
Figure 1 is a view showing the improved scale in side elevation.

The scale constituting the subject-matter of this invention is of the type disclosed in my co-pending application, Serial No. 22,641, filed May 21, 1935, wherein the weighing platform and its connections with the scale beam have been illustrated in detail but a modified form of gate actuating means provided.

The base 1 of this scale is in the form of an elongated housing formed of strong metal and open at its bottom so that access may be had to the interior thereof when assembling or when repairs or replacement of parts mounted therein is necessary. Within the base or housing is mounted a weighing platform 2 extending longitudinally therein between a receiving platform and a delivery platform 3, which arrangement of parts is the same as disclosed in the co-pending application referred to above. There has also been provided an endless conveyor 4 for moving material from the receiving platform along the weighing platform onto the delivery platform and from this delivery platform through the base or housing at one end thereof into a suitable receptacle after it has been weighed. A hopper 5 rises from the base at one end thereof over an inlet formed through the top of the base and at one side the hopper carries a supporting arm 6 to which a scale beam 7 is pivotally mounted. A link 8 which extends vertically has its upper end pivoted to the inner end of the scale beam 7 and its lower end pivoted to the rocker arm 9 of the scale mechanism which is pivoted, as shown at 10, and carries a cross beam 11 upon which the weighing platform 2 rests. Pivoted to the housing is a yoke 12, as shown at 13, and the yoke in its turn is pivotally connected with the rear or inner end of the arm 14 which extends through and is pivoted to the link 8, as shown at 15. When the weights 16 and 16' of the scale beam are set for a certain amount of material which may be 100 pounds or any amount desired, the scale will be evenly balanced when 100 pounds of material is moving across the weighing platform and the arm 14 will be substantially horizontal but the quantity varies by material not flowing at the correct speed from the hopper 5 onto the receiving platform for movement across the weighing platform by the endless conveyor 4 the difference in weight will cause the arm 14 to swing vertically about its pivot 15 and a link 17 connected with the outer or forward end of the arm will be shifted vertically either upwardly or downwardly according to the direction in which the arm rocks. The upper end portion of the link 17 extends into a switch box 18 where it is pivoted to a rocker arm 19 pivoted, as shown at 20, and at its upper end carrying horse-shoe magnets 21 and 22 which cooperate with glass mercury tube switches 23 and 24 in a manner to be hereinafter set forth.

The ground material is delivered from a bin 25 or other source of supply into the hopper 5 and flows from the hopper through the outlet 26 in the bottom thereof into the base and down upon the receiving platform. The finely ground material has a tendency to pack in the hopper and in order to agitate the material and feed it towards the outlet, there has been provided an agitator 27 which is pivotally mounted to rock about a horizontal axis, as shown at 28, and provided with a shank 29 to which is pivoted a link or pitman bar 30. The pitman bar has its other end pivoted to a crank arm 31 carried by the shaft 32 of a motor 33 and the motor shaft also carries a pulley 34 engaged by a belt which is also trained about the pulley 36 carried by the shaft 37. The shaft 37 is journaled through the base and constitutes means for imparting movement to the endless conveyor 4. By providing the agitator, the ground material in the hopper will be broken up if it cakes in the hopper and fed through the outlet in the bottom thereof.

Figure 2:
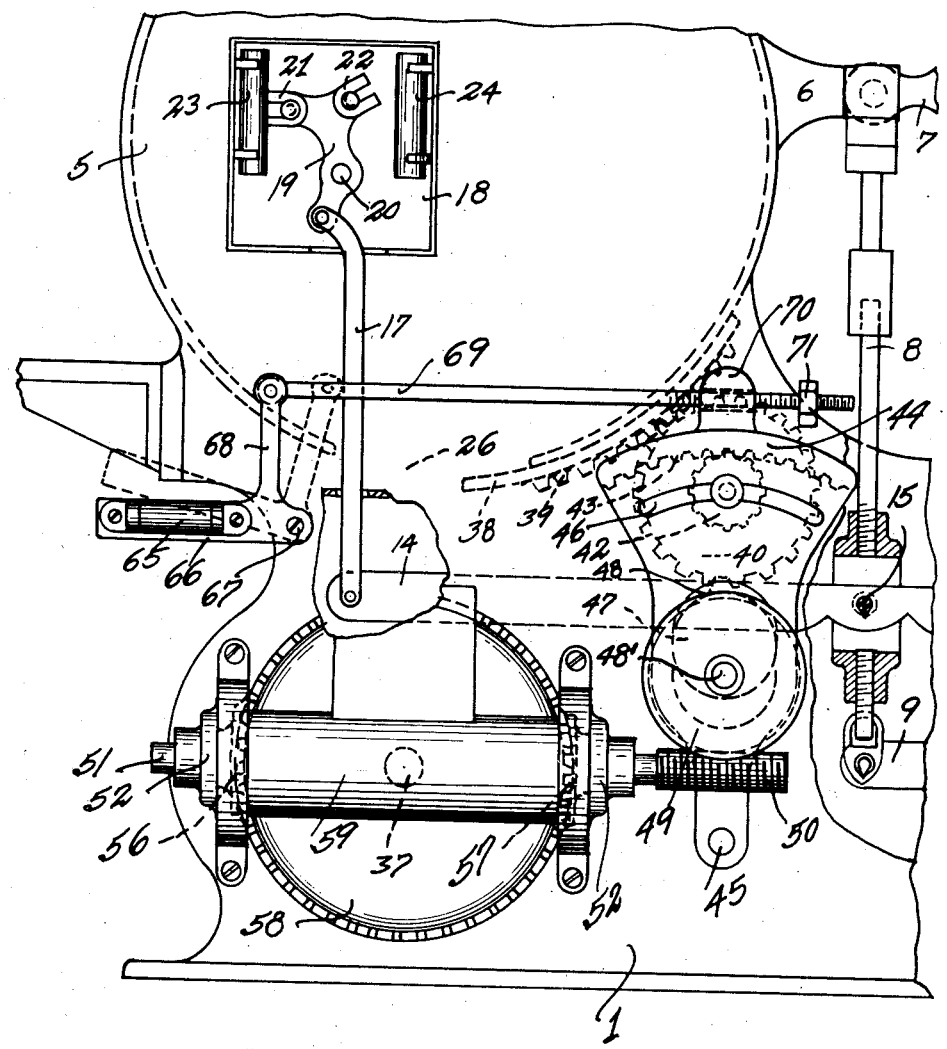
Figure 2 is an enlarged view showing a portion of the scale in side elevation.

The speed at which the ground material is fed from the hopper through the outlet must be controlled in order that a body of material weighing the predetermined amount will at all times be moving across the weighing platform. In order to do so, there has been provided a door or gate 38 which is arcuate to conform to the contour of the hopper and slidably mounted for movement into and out of closing relation to the outlet. A rack 39 is fixed to the gate adjacent each end thereof and extends circumferentially of the annular wall of the hopper and with each rack meshes a pinion 40 carried by a shaft 41. The shaft 41 is rotatably mounted through the base or casing 1 and has one end portion projecting from the casing, as shown in Figure 3. To this extended end portion of the shaft is fixed a gear or pinion 42 which meshes with the teeth of an arcuate rack 43 formed across the upper end of a quadrant 44 which is pivoted to a side wall of the casing 1, as shown at 45, and formed with an arcuate slot 46 through which the shaft 41 passes. A cam 47 which operates in an opening 48 formed in the quadrant is keyed to the shaft 48' and when the shaft is turned this cam will be turned with the shaft eccentric thereto and cause the quadrant to be swung longitudinally of the base or casing 1 and impart rotary motion to the shaft 41 so that the gate 39 will be moved towards or away from a position to close the outlet opening of the hopper according to the direction in which the shaft is turned. A worm gear 49 is also fixed to the shaft 48' outwardly from the cam, and this worm gear meshes with a worm 50 carried by a shaft 51. The shaft 51 is formed of non-conductive material such as brass and is rotatably mounted in bearings 52 carried by the base or housing 1. Steel collars 53 are secured to the shaft 51 by set screws and between these collars is mounted a sleeve 54 which fits loosely upon the shaft. Bushings 55 fit loosely about the shaft between the collars and the bearings and these bushings carry gears 56 and 57 which mesh with diametrically opposed portions of a large gear 58 carried by the shaft 37 which continuously rotates when the scale is in operation and the motor 33 running. A solenoid 59 fits about the shaft 51 between the annular flange 60 of the bushings 55 and has its coils 61 and 62 separated by the collar 63 provided midway the length of the spool 64 of the solenoid, as shown in Figure 7. When one or the other of the coils is energized, the sleeve 54 is magnetized and through the companion collar 53 the magnetic force passes into the companion bushing 55 and acts as a clutch to cause rotary motion to be imparted to the shaft 51 from the shaft 37, the direction in which the shaft 51 rotates being controlled according to whether rotary motion is transmitted to the shaft 51 by way of the gear 56 or the gear 57. Rotation of the shaft 51 in one direction swings the quadrant 44 in a direction to effect closing of the gate 38, while rotation of the shaft 51 in the opposite direction causes the gate to be opened. Therefore, the speed at which ground or powdered material flows from the hopper can be controlled. In case the hopper becomes empty or the material therein should cake to such an extent that it ceases to flow from the hopper, the motor should be shut off, and, in order to do so, there has been provided a mercury switch 65 mounted upon a rocker bar or bracket 66 which is pivoted at one end, as shown at 67. The vertically extending arm 68 of the bracket 66 has its upper end pivoted to one end of a link or rod 69 which extends longitudinally of the scale and has its other end portion loosely received through a lug 70 rising from the top of the quadrant midway the width thereof. This end portion of the rod is threaded and carries a nut 71 serving as an abutment adapted to be engaged by the lug and shift the rod longitudinally to rock the bracket to the position indicated by dotted lines in Figure 2 and tilt the mercury switch to a position in which flow of current to the motor will be shut off. In view of the fact that the rod is slidable through the lug, the quadrant may have sufficient movement to effect opening and closing adjustment of the gate without shutting off the motor, but if the hopper becomes empty, the quadrant will move to such an extent that the lug will engage the abutment nut and the switch 63 will be tilted into position to open the motor circuit. A master switch 72 is provided in order that the motor circuit may be manually opened or closed by the person operating the scale.

Referring to the wiring diagram shown in

Figure 8, it will be seen that the usual power wires 73 and 74 are provided for obtaining power from a city supply. When the motor circuit is closed, the current flows through the transformer 75 which reduces the voltage to 9 volts or any other predetermined voltage. From the transformer the current passes through a fuse 76 to a rectifier 77 which changes the current from alternating current to direct current of about six volts. The other lead 78 completes the circuit through the rectifier. From the rectifier the current now passes to the mercury tubes 24 by way of the conductor 79 which is split, as shown at 80. Conductors 81 and 82 lead from the mercury switches to outer ends of the solenoid coils and it will be readily understood that when either one of the mercury tubes is engaged by the cooperating magnet 21 or 22 during tilting of the bracket 19 by movement of the arm 14, a circuit will be completed through one of the coils of the solenoid and the gate of the hopper adjusted. When the proper quantity of material is flowing from the hopper, the bracket 19 will be in its vertical or neutral position and both solenoid coils will be inactive, but when either too much or not enough material is being delivered from the hopper the proper solenoid coil will be energized and motion will be imparted to the quadrant to open or close the gate. If no material or only a very little is delivered from the hopper, the quadrant will be moved to such an extent that the mercury tube switch 65 will be tilted to a position in which the motor circuit will be broken and the motor shut off. The attendant will then know that a fresh supply must be placed in the hopper or if he finds that there is plenty of material in the hopper, he will know that it has become caked to such an extent that the agitator cannot feed it through the outlet of the hopper. A condenser coil 83 is provided to dampen or retard the electrical energy caused by the solenoids and in this manner lessen the strain on the mercury switches. There have also been provided signal lights 84 and 85 which are connected with the center conductor 86 for the solenoid by a conductor 87 and other conductor wires 88 lead from the signal lights to the conductors 81 and 82. The signal lights operate when the scale is out of commission for any reason, such, for instance, should it stop weighing or the quadrant fail to operate.

When this scale is in use, the ground or powdered material is fed into the hopper from a bin 25 or in any other desired manner and from the hopper it flows through the outlet thereof onto the receiving platform under the hopper. The endless conveyor carries the material across the weighing platform longitudinally thereof onto the delivery platform and if the material is fed at the proper speed, the scale will be kept balanced, it being understood that the scale may be set to balance any predetermined weight of material. The agitator keeps the material in the hopper stirred up so that it may be fed through the outlet at the bottom and delivered onto the receiving platform. When the scale is working properly the gate remains open a pretermined extent, but if the material should feed too fast or not fast enough, the arm 14 will be moved by raising or lowering the weighing platform and the bracket 19 tilted towards one side or the other to close the mercury switch 23 or 24 and energize the companion coil of the solenoid. The shaft 51 will then be caused to rotate in the predetermined direction and the quadrant rocked about its pivot to cause opening or closing of the gate and a larger or smaller quantity of material permitted to pass through the outlet of the hopper. The quantity of material fed from the hopper will thus be automatically controlled and a predetermined weight maintained upon the weighing platform. The material is moved along the weighing platform at a steady rate of speed and by timing the operation of the scale or providing a counter and means to operate it each time the conveyor has made a complete replacement of material upon the weighing platform, as shown in the co-pending application previously referred to, it can be accurately determined how much material has passed through the scale.

Having thus described the invention, what is claimed as new is:

1. In a scale, a casing, a hopper over said casing having an outlet in its bottom, a weighing platform in said casing for receiving material from said hopper, balancing means for said platform, a conveyor for moving material along said platform, a drive shaft for said conveyor rotatably mounted transversely through said casing, an electric motor for rotating said drive shaft, an agitator in said hopper actuated by said motor, a gate for the outlet of said hopper movable into and out of closing relation thereto, adjusting means for said gate actuated from said drive shaft and including a clutch for controlling directional movement of the gate, electrical means for adjusting said clutch including a switch actuated by said balancing means, and means for opening the circuit for said motor and shutting off the motor when the gate is opened beyond a predetermined extent.

2. In a scale, a casing, a hopper over said casing having an outlet in its bottom, a weighing platform in said casing for receiving material from said hopper, balancing means for said platform, a conveyor for moving material along said platform, a drive shaft for said conveyor rotatably mounted transversely through said casing, an electric motor for rotating said drive shaft, a gate movable into and out of closing relation to the outlet of said hopper, a rack carried by said gate, a gate operating shaft carrying a pinion meshing with the rack and a gear, a quadrant having rack teeth meshing with said gear, a worm gear, a cam for moving said quadrant turning with said worm gear, a transmission shaft having a worm meshing with said worm gear, a gear carried by said drive shaft, gears loose upon said transmission shaft and meshing with opposite side portions of the gear of the drive shaft, a clutch slidable along said transmission shaft between its gears, a double coil solenoid about the transmission shaft and clutch and having a circuit including a switch actuated by movements of the balancing means for the weighing platform to selectively energize the coils and move the clutch into engagement with the gears of the transmission shaft to rotate the transmission shaft in predetermined directions and actuate the quadrant to open and close the gate, a motor switch, and means actuated by said quadrant to open the motor switch when the gate is opened beyond a predetermined extent.

3. In a scale, a casing, a hopper over said casing having an outlet at its bottom, a weighing platform in said casing for receiving material from said hopper, balancing means for said platform, a conveyor for moving material along said platform, a drive shaft for said conveyor, a motor for rotating said shaft, a gate for said hopper movable towards and away from a closed position, actuating means for said gate including a rotatable shaft and a pivotally mounted quadrant having geared connection therewith, a transmission between the drive shaft and said quadrant for moving the quadrant in a predetermined direction including a clutch and a double coil solenoid for operating the clutch, and a circuit for the solenoid having a switch for controlling flow of current through the coils and means actuated by the balancing means for the weighing platform for actuating the switch and energizing a predetermined coil to move the quadrant in a direction to open or close the gate.

4. The structure of claim 3 wherein the transmission shaft carries a pair of loosely mounted gears spaced from each other longitudinally thereof and meshing with opposite side portions of a gear carried by the drive shaft, a sleeve about the transmission having clutch members at its ends, the loose gears having clutch members for individual engagement by the clutch members of the sleeve when the sleeve is shifted longitudinally upon the transmission shaft, the solenoid having its coils carried by a spool fitting about the sleeve and separated from each other by a partitioning collar carried by the spool between the coils and each disposed about an end portion of the clutch sleeve whereby the sleeve will be shifted along the transmission shaft to engage the clutch member of a predetermined loose gear when the switch is operated to energize a predetermined coil.

5. The structure of claim 3 wherein the quadrant is pivotally mounted at its lower end for swinging movement longitudinally of the casing, an arcuate slot being formed in the upper portion of the quadrant transversely thereof and receiving an end portion of the gate adjusting shaft, an arcuate rack carried by the quadrant over the slot and meshing with a gear carried by the gate adjusting shaft, the transmission including a rotatably movable shaft carrying a worm, a stub shaft rotatably carried by the casing, a worm gear carried by said stub shaft and meshing with the worm, and a cam disc carried by the stub shaft and engaging the quadrant to swing the quadrant about its pivot and impart movement to the gate shaft when the transmission shaft is rotated and move the gate in an opening or closing direction.

6. The structure of claim 3 wherein the switch for selectively energizing coils of the solenoid comprises a pair of mercury tubes each interposed in the circuit of a companion coil of the solenoid, said tubes being spaced transversely from each other, a bracket pivotally mounted between the tubes for swinging movement towards and away from the tubes, magnets carried by an end portion of said bracket and each moved towards its companion tube during pivotal movement of the bracket while the other magnet moves away from its companion tube, and a link connecting said bracket with the balancing means for the weighing platform and imparting movement to the bracket when the balancing means is moved by variation of weight of material upon the weighing platform.

7. The structure of claim 3 and a switch for the motor circuit, a bracket carrying said motor switch and pivoted to the casing and provided with an arm, and a rod extending from said arm and loosely engaged through a portion of the quadrant and carrying an adjustable abutment for engagement by the quadrant to exert pull upon the rod and tilt the bracket to move the switch to a position opening the motor circuit when the gate is opened beyond a predetermined extent.

8. In a continuous weighing scale, a casing, a weighing platform in said casing, balancing means for said platform, a hopper having an outlet for delivering material to said platform, a gate for the outlet movable towards and away from a closed position, a conveyor for moving material along said platform having a drive shaft, a motor for driving said shaft, a gate adjusting means, means for transmitting motion from said shaft to the gate adjusting means including an electrically actuated clutch for controlling directional movement for the gate adjusting means, and a switch for selectively energizing the clutch to impart movement to the gate in a predetermined direction actuated by the balancing means for the weighing platform.

9. The structure of claim 8 having a switch provided for the motor, and means actuated by movement of the gate adjusting means for actuating the switch to shut off the motor when the gate is opened beyond a predetermined extent.

GLEN G. MERCHEN.